Nov. 29, 1960  G. T. RANDOL  2,961,832
MASTER CYLINDER FOR HYDRAULIC BRAKE SYSTEMS
Filed Oct. 27, 1958  2 Sheets-Sheet 2
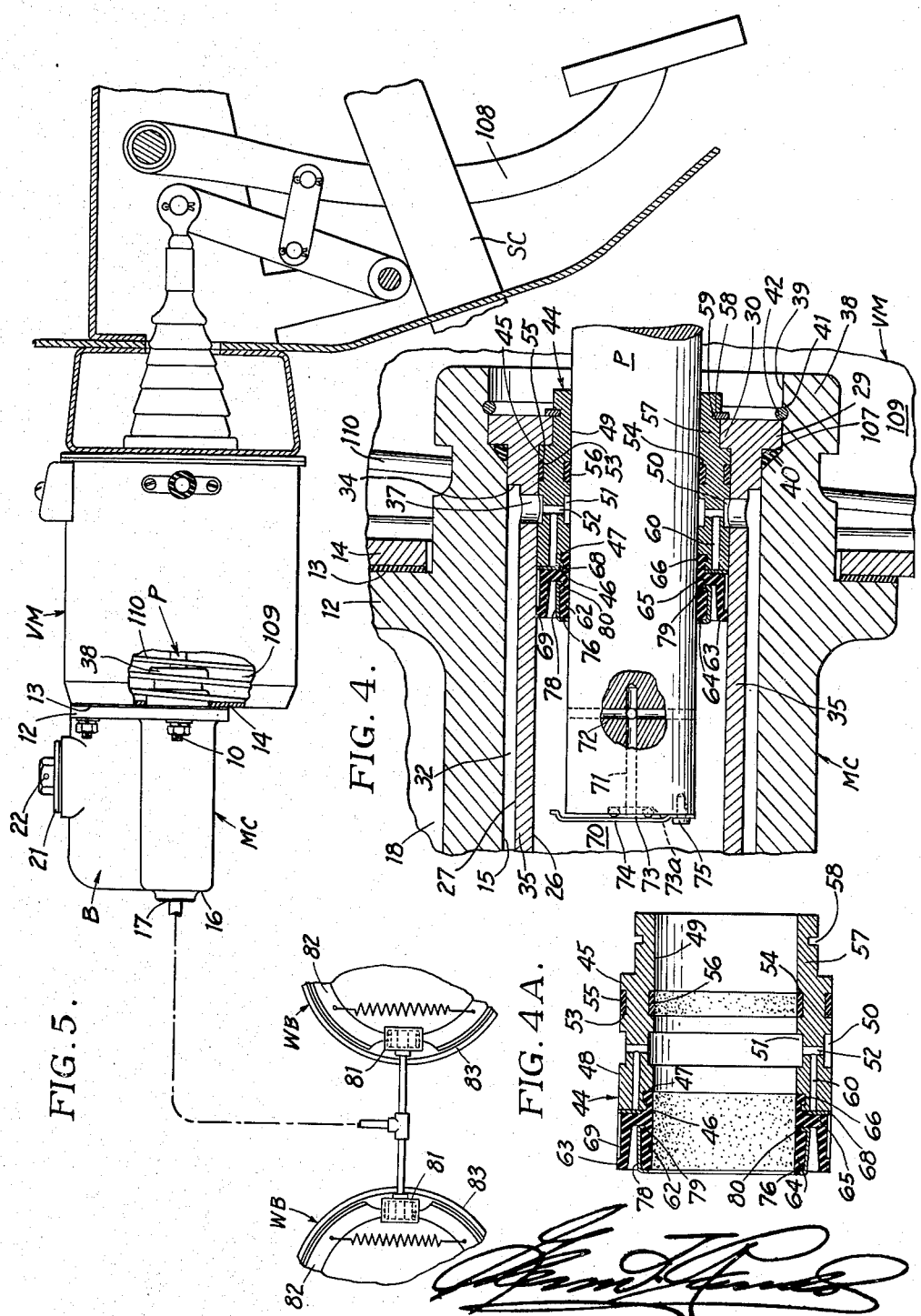
Inventor

United States Patent Office 2,961,832
Patented Nov. 29, 1960

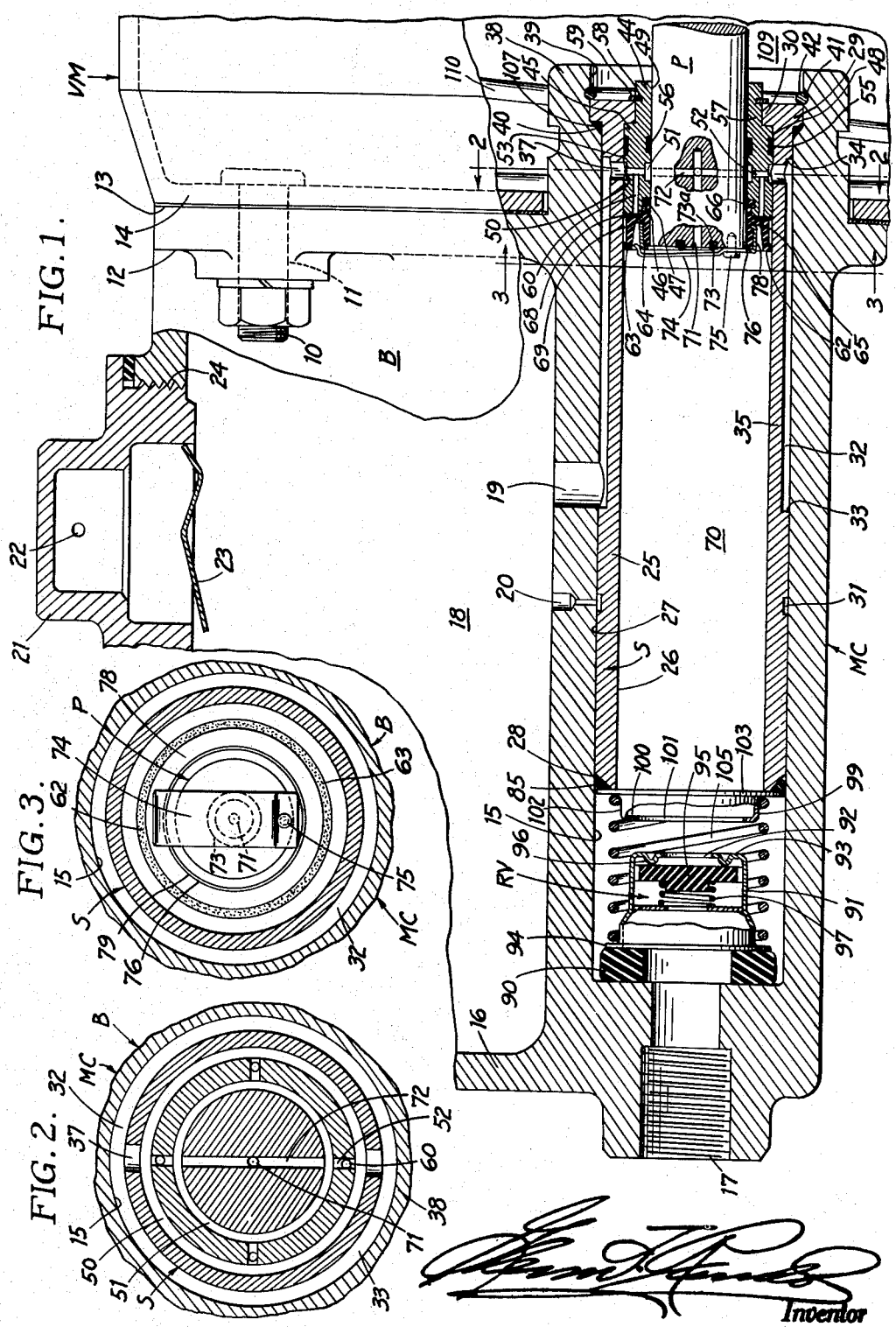

2,961,832

MASTER CYLINDER FOR HYDRAULIC BRAKE SYSTEMS

Glenn T. Randol, Box 53, 2nd and Paul Sts., Mountain Lake Park, Md.

Filed Oct. 27, 1958, Ser. No. 769,888

5 Claims. (Cl. 60—54.6)

My invention relates to fluid pressure systems such as the hydraulic brake system for automotive vehicles and the like, the invention having particular reference to the construction of the fluid-displacing unit of a master cylinder in such a system.

A primary object of my invention is to provide improved fluid-displacing plunger structure which may be utilized in conventional master cylinders in lieu of the spool-type assembly with which such master cylinders are conventionally equipped for operation by a foot pedal or treadle, said plunger structure distinguishing from the piston structure by being longer than its operating stroke, while the piston is shorter than its operating stroke.

A more specific object is to provide a conversion plunger assembly for a conventional master cylinder body which enables the vehicle brakes to be applied with proportionally greater pressure or effective leverage between the brakes and the actuating force, and therefore, especially suited for operation by pressure differential motors preferably of the type utilizing vacuum as commonly employed on present-day motor vehicles as the power-brake actuator which require, due to limitations in the available installation space in the engine compartment, and the size of the unit to obtain the pressure differential force, a specially constructed master cylinder of the plunger displacing type having a smaller cross-sectional area than the working cylinder and a longer stroke than conventional piston-type master cylinders, to provide the leverage for a given size motor to develop the necessary braking force. Moreover, in the case where a conventional master cylinder is associated with such a motor, further limitations in the effective pressure are encountered due to the shorter stroke of the piston and larger cross-sectional area thereof. It is therefore, a further object to convert a conventional master cylinder without altering the body or ports thereof in any manner, to a plunger-type fluid displacing assembly having less cross-sectional area than the working cylinder to augment the effective pressure available in relation to the actuating force exerted on the assembly as against the piston formerly employed.

A further important object is to provide a simplified construction and ease of assembly of parts to facilitate ready removal for repair and/or replacement when necessary, and to reduce the cost of a power-brake unit by utilizing the original equipment master cylinder body which may be readily converted to power operation by substituting the plunger assembly of the present invention for the conventional spool-type piston with which such master cylinders are originally equipped for suspended-pedal actuation. A further advantage stems from the use of conventional master cylinders for either power and/or operator operation, in that replacement of the cylinder may be made very economically as against the special design for certain power brakes now on the market, and, too, the same motor design and output may be used in association with all such conventional master cylinders to provide a power-assisted braking system, and therefore, any hydraulic braking system may be readily and economically converted from a driver-operated system to a power-assisted system, particularly such braking systems that employ a suspended-pedal which enable mounting the power-brake unit on the engine side of the firewall for accessibility in the same space previously occupied by the master cylinder.

With these and other objects and advantages in view, the invention consists of the new and novel combination, construction, and arrangement of parts as hereinafter more fully described, set forth in the claims appended hereto, and disclosed in the accompanying drawings forming a part, hereof, wherein:

Figure 1 is a longitudinal sectional view through a master cylinder embodying my invention and showing the parts in their normal positions corresponding to brake "off" condition. The approved symbol for indicating the brake fluid has been purposely omitted from all figures of the drawing to prevent obscuring the structure;

Figure 2 is a transverse sectional view taken along the line 2—2 of Figure 1, looking in the direction of the arrows, to show details of the compensating and return passageway incorporated in a principal part of my invention;

Figure 3 is another transverse sectional view taken along the line 3—3 of Figure 1, looking in the direction of the arrows, to show detail of the compensating valve and associated passageway controlled thereby carried by the plunger;

Figure 4 is a fragmentary view of Figure 1 on an enlarged scale showing the parts in operated positions corresponding to brake "on" condition;

Figure 4A is an enlarged view taken from Figure 4 of the plunger seal retainer per se; and Figure 5 is a schematic depiction of my improved master cylinder associated with a conventional power-assisting motor of the pressure differential type, to operate the hydraulic braking system of a motor vehicle;

Referring now to the drawings and particularly to Figures 1, 2 and 3, I have used the reference character "MC" to indicate the master cylinder as a whole, and the body is designated by reference character "B" which may be mounted in operating position in the usual manner by bolts 10 projecting through holes 11 in the flange 12 having a finished outer surface 13 to the front end wall 14 of a pressure differential motor "VM" shown fragmentarily in Figure 1, to be operated thereby. The body B has a cylindrical finished bore 15 open at one end and closed at the other by a wall 16 through which a discharge port 17 is provided, a fluid reservoir 18 formed in the body above the bore 15 communicates with the bore 15 via an intake port 19, and a normally disposed compensating port 20 spaced forwardly of the intake port being closed off as will appear. A removable reservoir filler cap 21 is provided with a breather vent 22 and a baffle member 23 to prevent fluid-surge from discharging fluid through the vent, and which closes a circular threaded opening 24 by threaded engagement therewith, all being of conventional construction.

Fixed in close tolerance relation in the bore 15 is an elongated tubular member disclosed as a cylindrical sleeve generally designated "S" of special construction and comprising: a normal cylindrical wall 25 having inner and outer finished cylindrical surfaces 26, 27 respectively, an angular inner end face 28, outturned and inturned circularly aligned flanges 29, 30 terminating the opposite (rear) end, an annular fluid collector groove or trap 31 in circular alignment with the compensating port 20, an annular channel 32 in the outer surface 27 extending substantially from an intermediate point on the sleeve to the flange 29, said channel defining external annular shoulders 33, 34 and a reduced diameter wall portion 35 through which a plurality of intake ports 37 spaced forwardly adjacent shoulder 34 to maintain the inner surface 26 and said channel in communication with each other. The sleeve S is removably fitted in the bore 15 in close tolerance relationship such that fluid-tight sealed relation obtains between the complemental finished surface 15, 27, and the groove 31 is circularly aligned with the compensating port 20 to close this port from communicating with the bore 15 and interior of the sleeve, while intake port 19 maintains fluid communication between the reservoir 18 and channel 32 whereby said port serves in part to supply fluid from the reservoir 18 to a plurality of ports 37 to replenish any fluid deficiency in the hydraulic system during a braking operation and to return any excess fluid in the system to the reservoir following a braking application as is understood.

Projecting rearwardly from the finished surface on the mounting flange 12 is a hollow hub portion 38 coaxially disposed with respect to bore 15 and having an inner cylindrical surface 39 larger in diameter than the bore 15 to provide an internal annular shoulder at 40 and an internal annular groove 41 spaced rearwardly of the shoulder 40 in the surface 39, the aforesaid sleeve flange 29 engages said shoulder 40 in circular alignment with the space between the shoulder and groove, and a resilient split retainer ring 42 engages said groove to prevent axial displacement of the sleeve S with respect to the bore 15.

A tubular thrust-backing member disclosed as a bushing-type seal retainer 44 is illustrated per se in Figure 4A and shown incorporated in the sleeve S in juxtaposition with respect to the inner face of the inturned flange 30 aforesaid, said bushing having a normal diameter portion 45 provided at its forward end with a reduced diameter annular flange 46 spaced from the normal end wall to provide an annular groove 47 therebetween, intermediately disposed in the outer and inner finished surfaces 48, 49 are circularly aligned annular channels 50, 51 in the normal diameter portion which are interconnected by a plurality of radially disposed ports 52, rearwardly spaced with respect to said channels are circularly aligned outer and inner grooves 53, 54 fitted with pliant ring sealing members 55, 56 respectively, and projecting from the inner marginal portion of the rear end wall is a reduced diameter portion 57 through which the inner finished surface 49 extends. This reduced diameter portion projects through the inner marginal portion of the inturned flange 30 aforesaid and is provided with an external annular groove 58 adjacent the outer face of the flange 30 and is fitted with a split retainer ring 59 to confine the inturned flange between said ring and normal wall portion of the seal retaining bushing 44 and thereby inhibit axial displacement of the seal retainer with respect to the sleeve S best demonstrated in Figures 1 and 4. Channel 50 is disposed in circular alignment with the intake ports 37 to establish fluid communication between channel 32 and the interior of the seal retainer via the radial ports 52, a plurality of longitudinal passageways 60 extends from the forward end face of the retainer 44 to intersect the radial ports 52. Disposed on the forward end face of the retainer 44 is a pliant ring-type packing or seal 62 having outer and inner horizontally disposed lips 63, 64 respectively interconnected by a vertical wall segment 65, said segment 65 being provided with a complemental circular flange 66 in offset relation for engaging the retainer groove 47 to stabilize the seal on the retainer 44. A thin metallic washer 68 is embedded in the outer peripheral portion of the wall segment 66 to overlie the confronting ends of the passageways 60 to maintain them closed during a braking operation and to flex with the seal to open these passageways to enable fluid from the reservoir 18 to pass over the outer surface of the outer lip 63 via surface flutes 69 during release of the brakes which will be more fully explained later.

An actuatable thrust-transmitting member or cylindrical plunger "P" operably projects through the seal retainer 44, inner seal 56, and inner lip 64 of the seal 62, which, in its normal fully retracted position shown in Figure 1, provides a variable pressure-working chamber 70 which serves to pressurize the fluid therein when the plunger P is actuated to reduce the size of said working chamber as demonstrated in Figure 4. The free end of the plunger P is provided with a coaxial passageway 71 which intersects a cross passageway 72 which in turn communicates with the inner channel 51 when the plunger P is fully released (see Figure 1). The open end of the passageway 71 is encircled by a pliant O-ring 73 embedded in a circular channel 73a to approximately two-thirds of its cross sectional diameter to form a valve seat which is controlled by a "compensating valve" disclosed as a flat spring 74 having offset extremities one of which is anchored to the free end of the plunger by a drive nail 75, and the other offset free end of the spring 74 is normally deformed out of parallel engagement with the O-ring seat 73 to open the passageway 71 by engagement of its free offset end with an inturned flange 76 of a conical sleeve member 78 disposed between the lips of the seal 62 with the other end of said member inturned at 79 to lock into a complemental groove 80 in the seal whereby the member and seal are united.

Movement of the plunger P into the working chamber 70 reduces its size as aforesaid to pressurize the fluid and discharge it through the discharge port 17 to wheel cylinders 81 of the vehicle brakes generally designated "WB" (see Figure 5) and comprises brake shoes 82 and wheel drums 83, to apply the brakes in a manner well understood. Initial movement of the plunger from its normal released position shown in Figure 1 withdraws the free end of the compensating valve 74 from the seal flange 75 and thus releases the spring valve 74 to assume its normal parallel relation with respect to the end face of the plunger and thereby closes the passageway 71 which operation conditions the working chamber 70 to pressurize the fluid. The resilient nature of the leaf spring 74 enables the passageway 71 to be opened momentarily should a temporary vacuum condition obtain in the working chamber as a consequence of sudden withdrawal of the plunger toward its released position. Thus, in this way, the compensating valve 74 supplements movement of fluid from the reservoir 18 via the flutes 69 to prevent cavitation in the hydraulic system during such rapid release of the brakes which operation will be more fully explained later. It is thus seen that closure of the compensating passageway 71 is requisite to pressurizing the fluid in the master cylinder MC.

The angular end face 28 of the sleeve S is preferably fitted with a pliant O-ring packing or seal 85 of commercial construction to seal off the exterior of the sleeve S from the working chamber 70.

A removable ring-type valve seat 90, preferably made of pliant material, encircles the inner end of the discharge port 17 in intimate contact with the finished inner surface on the end wall 16. A residual pressure check-valve assembly generally designated "RV" having a cup-shaped housing 91 with an opening 92 through its end wall 93, and its open end being formed with an outturned annular flange 94 parallel to the end wall to movably engage the seat 90, said check-valve assembly including a self-contained discharge one-way check-valve 95 for enabling fluid under pressure to be displaced through the discharge port 17, and which cooperates with an annular seat 96 encircling the opening 92 under influence of a normally preloaded compression spring 97. A cup-shaped member 99 having an end wall 100 provided with a central opening 101 and the opposite or open end of the cylindrical wall 102 terminates in an outturned vertical flange 103 in parallel relation to the end wall 100, which engages the O-ring 85. Another normally preloaded compression spring 105 is operably disposed between flanges 94, 103 and continuously reacts on these flanges to urge them into engagement with the seat 90 and the O-ring 85 into effective fluid sealing relation with respect to the angular end face 28 and bore 15, respectively. The biasing action of spring 105 against the O-ring is supplemented by the force of the pressurized fluid during the braking action to prevent fluid loss, and therefore, pressure, between the complemental finish surfaces 15, 27. The preloaded status of spring 105 is commercially set at 8–12# to establish a residual line pressure corresponding to such preloaded strength of said spring which also continuously reacts on the O-ring 85 to maintain it under compression in sealing condition to prevent possible fluid-leakby between the sleeve S and bore 15.

Another pliant O-ring packing 107 of commercial construction is provided between the juncture of the cylindrical wall 25 and flange 29 and the confronting chamfered rear end of the bore 15 to insure a fluid-tight seal at this point even though only fluid under static (non-pressurized) condition is present at all times.

An exemplarily commercial application of my improved master cylinder MC is schematically illustrated in Figure 5 wherein the conventional vacuum-booster motor VM of commercial construction and operation is mounted on the vehicle indicatd by fragmentary portions of its firewall and associated steering column "SC," said motor being employed to actuate the thrust-transmitting plunger P and thereby slidably move it into the pressure-working chamber 70 to effect the braking action in response to reduced operator effort applied to pedal 108. Operably disposed within the vacuum-power chamber 109 of the motor VM is a normally preloaded compression spring shown at 110 in Figures 1 and 5 which continuously urges the movable power assembly (not shown) toward the right or released position shown in this figure wherein the plunger P is correspondingly disposed in Figure 1. Accordingly, the plunger P and the movable power assembly of the motor act together, the spring 110 serving to urge the plunger P toward its normal released position to take the brakes "off" as air is admitted into the power chamber in response to removing pressure from the pedal 108 as the art profusely demonstrates.

*Operation*

In the operation of my improved master cylinder, the parts are normally in the positions of Figure 1 under action of the spring 110. This spring reacts on the plunger P to reset it and whatever type of actuating mechanism, such as the illustrated motor VM, or the pedal 108 alone, is employed to drive the plunger into the sleeve S against the action of the spring 110 to reduce the size of the working chamber 70 and thereby pressurize the fluid to effect the braking action. Initial movement of the plunger to the left as viewed in Figure 1 toward Figure 4 position, withdraws the free end of the flexible compensating valve 74 from the seal flange 75 and due to its flexible nature it simultaneously assume a parallel relation across the face of the free end of the plunger P to close the coaxial passageway 71 and thus isolates the fluid in the pressure-working chamber 70 from that in the reservoir 18 and associated ports and passageways in the tubular bushing 44. Closure of the coaxial compensating passageway 71 conditions the master cylinder MC to pressurize the fluid to actuate the wheel cylinders and thus expand the brake shoes 82 into frictional contact with the brake drums 83 to whatever degree necessary to stop or slow the vehicle as required. Accordingly, the operation of my improved master cylinder MC is similar to the operation of commercial master cylinders used in present-day hydraulic braking systems. However, my improved master cylinder combines new and novel interaction and arrangement of fluid-displacing parts which replace the conventional spool-type piston with facility to convert a conventional master cylinder to one which is capable of being operated through a longer stroke by utilizing a plunger-type fluid-displacing unit of different cross-sectional areas not necessarily the same cross-section as the cylinder, to make such conventional master cylinder bodies readily adaptable to operation by any commercial type of vacuum or air-pressure operated motor to produce the required line pressure for power-brakes, especially of the low-pedal type which combines shorter travel and less mechanical advantage for the operator.

As the plunger P is driven into the cylindrical sleeve S after the compensating valve 74 has been closed to the position shown in Figure 4, the fluid in the working chamber 70 becomes pressurized by the output of the motor VM assisting operator force exerted on the pedal 108 (see Figure 5), to such magnitude that the brake shoes 82 are brought into sufficient frictional contact with their respective brake drums 83 as to effect the decelerating force desired. Under these circumstances the compensating passageway 71 remains closed and also the passageways 60. This completes the "brake-applied" condition.

To release the brakes, the operator only has to remove foot pressure from the pedal 108, which admits air into the power chamber by way of the control valve (not shown), enabling the return spring 110 to withdraw the plunger P and power assembly (not shown) toward their respective released positions demonstrated in Figure 1 and 5. During this releasing movement of the plunger P, fluid is drawn, particularly during a fast release, from the reservoir 18 through the passageways 60, flutes 68 over the lip 63 into the working chamber 70 to maintain the system filled, such replenishment being effected by a temporary vacuum condition which may obtain in the working chamber 70 as a result of such fast withdrawal of the plunger P. Upon full release of the plunger as shown in Figure 1, the copensating passageway 71 is again opened by the free end of the flexible valve spring 74 engaging the seal flange 75 to flex said spring away from the open end of the passageway as demonstrated in Figure 1 whereby any excess fluid in the system can return to the reservoir 18 via the cross-passageway 72, channels 50, 51 and interconnecting ports 52, return ports 37, annular space 32, and intake port 19. During this releasing operation there is also another operation occurring as a function of the residual pressure valve RV which becomes unseated to enable the return fluid to pass from the wheel cylinders 81 back into the pressure working chamber 70 while the discharge check-valve 95 remains closed. After the plunger P and associated movable parts assume their normal released position, the residual pressure valve seats under influence of spring 105 to establish the line pressure external to the discharge port at the minimum pressure of 8–12# according to factory specifications, and the fluid in the chamber 70 and reservoir 18 is adjusted to its normal condition at atmospheric pressure by the inter-flow accommodated by the open compensating passageway 71 in readiness for another braking cycle.

Braking applications requiring extremely high pressure conditions within the working chamber 70, may force a minute quantity of fluid past the O-ring seal 85 and eventually where the brakes are sustained "on" under such conditions, such leakby may displace between the sleeve S and bore 15 to the collector groove 31, the latter serving to trap such forced leakby and return it to the reservoir via the port 20 best demonstrated in Figure 1.

While I have disclosed a special type of sleeve construction for converting a conventional master cylinder body to produce higher pressure conditions than normally available from a given power output acting on a spool-type piston with which such master cylinders are equipped, I wish to make it clear than my invention contemplates integrating at least the forward portion of the sleeve S with the cylindrical wall of bore 15, and therefore, port 20 would, in such case, be eliminated as well as the angular end 28, O-ring 85 and spring seat 99. In such a rearrangement of the parts, spring 105 could be either contained in the residual pressure valve housing, or would react on the forward end of the plunger P, and, of course, commercial design would dictate such variations since the residual pressure valve RV may be disposed in the working chamber as in the present disclosure or in a branch line leading from said working chamber both of which are commerically practiced.

From the foregoing description augmented by an inspection of the drawings, it will be seen that I have produced a new and novel removable fluid-displacing unit or assembly of the plunger-type for incorporation in conventional master cylinder bodies in lieu of the spool-type piston normally forming a component of such cylinders; that such fluid-displacing unit provides for a longer working stroke within the limits of the cylinder body to increase the leverage-ratio with respect to the brake cylinders thus rendering the actuation thereof quite suitable for pressure differential motors of either the operator-assisted or full-power type. A further advantage is provided by utilizing the conventional master cylinder body which comes with the car as original equipment to eliminate this portion of the cost of the power-brake unit thus providing a low-cost easily installed power-brake without eliminating any of the components comprising the hydraulic brake system with which present-day motor cars are equipped.

Reference is now made to the terminology used in the foregoing description and in the appended claims in which the identifying expressions and/or terms employed are intended to convey meanings which include the range of reasonable equivalents in the patent sense. For example, the expressions "motor," "power chamber," "vacuum chamber," "booster," "pedal," etc., are intended to include any means for actuating the fluid-displacing plunger P whether said plunger carries the compensating valve directly or controls it from an operating position separate from the plunger. The terms "left," "right," "top," "bottom," "front," "vertical," "horizontal," "rear," and other directional words or characters are intended to have only relative connotation for convenience in describing the structure in the position depicted on the drawing, and are not intended to be interpreted as requiring any particular orientation with respect to associated structure external to the present disclosure or the operating position thereof.

Although the embodiment of my invention as disclosed herein and which is well calculated to fulfill the objects above stated, it will be appreciated that I do not wish such to be limited to the exact construction and/or arrangement of parts shown, since it is evident that modifications, variations, changes and substitutions may be made therein without departing from the proper scope or fair meaning of the subjoined claims.

Having thus described my invention, I claim:

1. In a master cylinder of the character disclosed, a cylinder body, a longitudinal bore in said body closed at one end and open at the other, a reservoir in said body disposed outside the said bore, a port interconnecting the bore and reservoir, an intake port spaced from the first-mentioned port interconnecting the reservoir and bore, a discharge port through the closed end of said bore, a counterbore terminating the open end of said longitudinal bore, an internal annular shoulder provided between said bores, and an internal annular groove provided in the counterbore in spaced relation with respect to said annular shoulder, the improvement which comprises: a removable cylindrical sleeve disposed in said longitudinal bore; an outturned annular flange terminating the end of the sleeve adjacent the open end of said longitudinal bore and in circular alignment with the space obtaining between the annular shoulder and groove aforesaid in engagement with said shoulder; a split retainer ring engaging said groove to prevent displacement of the sleeve with respect to the cylinder body; an inturned annular flange carried by the sleeve with its outer face in the same plane with the outer face of the said outturned flange; a reduced wall portion in said sleeve interconnecting a pair of longitudinally spaced annular shoulders in the outer surface of the sleeve to define an annular fluid chamber therebetween in continuous communication with said intake port; a plurality of ports through said reduced wall for interconnecting said annular channel with the interior of said sleeve; means on the sleeve for permanently closing the first mentioned port to negate its function; a hollow seal retainer fixed in the end of the sleeve adjacent the inturned flange aforesaid and having a reduced diameter portion projecting through the circular opening in the inturned flange; an external annular groove in the reduced diameter portion aforesaid adjacent the outer face of the inturned flange; a split retainer ring engaging said last-mentioned groove to fix the seal retainer to said sleeve; inner and outer circularly aligned grooves in the seal retainer; a pliant ring-type sealing element disposed in each of said last-mentioned grooves; an inner and outer channel circularly aligned and spaced forwardly of the last-mentioned grooves in the seal retainer with the outer channel in alignment with the said plurality of ports; a plurality of radially disposed ports in the seal retainer for interconnecting said inner and outer channels; a reduced diameter inturned flange spaced from the normal thickness of the seal retainer at the forward end thereof; a pliant ring-type sealing element having an inner and outer concentric lip interconnected by a vertical wall segment; a complemental flanged portion integral with the outer surface of the wall segment for engaging the space defined by the inturned flange on the forward end of said seal retainer; a conical sleeve member having outturned and downturned annular flanges terminating the ends thereof for cooperating with the last-mentioned sealing element to stabilize it against the forward end of the seal retainer; a metallic washer embedded in the outer peripheral marginal portion of said wall segment; a plurality of fluid passageways interconnecting the forward end of the seal retainer and the radial ports in said seal retainer, said passageways being controlled by said metallic washer; a plurality of surface flutes in the outer surface of the outer lip of said last-mentioned sealing element; a plunger operably projecting through the seal retainer in fluid-tight sealed relation and having a normal released position; a cross-passageway through the full diameter of said plunger in communication with the inner channel in the said seal retainer when the plunger is in released position; a coaxial passageway extending from the free end of said plunger to intersect said cross-passageway; a flexible compensating valve element carried on the free end of said plunger in overlying relation with respect to said coaxial passageway, said valve element being flexed out of parallel relation with respect to the end of the plunger to open said coaxial passageway by engagement of a portion thereof with said downturned flange aforesaid when the plunger is in released position; a variable pressure-working chamber defined normally by said plunger in released position and the closed end of said longitudinal bore; and means for actuating said plunger whereby initial movement thereof from released position releases said compensating valve to assume parallel relation with the end of said plunger to close said coaxial passageway to condition the pressure-working chamber to pressurize the fluid therein and subsequently displace it through said discharge port.

2. A master cylinder according to claim 1 including an angular face on the inner end of said sleeve; a V-shaped annular channel formed between said angular face and longitudinal bore; a pliant ring-type packing disposed in said V-shaped channel; a cylindrical cup-shaped spring seat member open at one end and closed at the other, a normally preloaded spring reacting between the closed end of said longitudinal bore and said spring seat member; an outturned annular flange terminating the open end of said cup-shaped member and bearing against said packing to maintain pressure thereagainst under influence of said last-named spring to effect fluid-tight sealing relation with respect to the V-shaped channel; and a central aperture through the closed end of said cup-shaped member to provide unrestricted fluid communication between opposite sides thereof.

3. A master cylinder according to claim 2 including an annular channel of triangular cross-section provided between the outer end of the longitudinal bore and the juncture of the sleeve and outturned flange at the outer terminus of said sleeve; and a packing disposed in said annular channel to effect a fluid-tight connection of said outturned flange, sleeve and said bore.

4. A master cylinder having: a body, a variable pressure-working chamber in said body having a discharge port, a reservoir in said body, a wall separating the chamber from the reservoir, the improvement which comprises: a removable tubular assembly including a cylindrical sleeve fixed in said working chamber; an annular fluid chamber between the sleeve and separating wall aforesaid; an intake port interconnecting the reservoir and annular chamber; an axially bored removable bushing adapted to close one end of said sleeve; passageway means through the sleeve and bushing interconnecting the annular chamber and axial bore in said bushing; a reciprocable element operably projecting through the axial bore in said bushing into said sleeve; a cross-passageway in the said element normally in communication with said passageway means; a longitudinal passageway in the said element normally opening into said working chamber and intersecting said cross-passageway; a bushing packing carried by said bushing in encircling relation with respect to said element; a movable compensating valve member carried by the said element for cooperating with the open end of said longitudinal passageway to open it by engagement with said bushing; and means for reciprocating said element.

5. In a combined master cylinder and reservoir: a removable cylindrical sleeve fixed in the cylinder; an annular fluid space dispose between the cylinder and the exterior of said sleeve; a fluid opening between the reservoir and said space; an axially bored detachable bushing adapted to close one end of said sleeve; a fluid opening between the said space and interior of said bushing; a pressure-working chamber defined by portions of the interiors of the cylinder and sleeve; a fluid-displacement unit operably projectable through the axial bore in said bushing from a normal released position into the working chamber; a pair of intersecting fluid passageways normal to each other in said unit, one of said passageways normally opening into the working chamber and the other passageway communicating with the last-mentioned fluid opening when the said unit is in normal position; a movable valve element carried by said unit for automatically closing said one passageway in response to initial operation of the unit from released position thereby conditioning the working chamber to pressurize the fluid therein; means for operating said fluid-displacement unit; and a fluid outlet in the cylinder through which the pressurized fluid is displaced from the working chamber upon further operation of said fluid-displacement unit.

References Cited in the file of this patent

UNITED STATES PATENTS

| | | |
|---|---|---|
| 2,074,719 | Carroll | Mar. 23, 1937 |
| 2,232,113 | Katcher | Feb. 18, 1941 |
| 2,477,758 | Majneri | Aug. 2, 1949 |
| 2,663,540 | Erickson | Dec. 22, 1953 |
| 2,672,009 | Hense et al. | Mar. 16, 1954 |
| 2,759,329 | Ponti | Aug. 21, 1956 |

FOREIGN PATENTS

| | | |
|---|---|---|
| 544,669 | Great Britain | Apr. 22, 1942 |
| 567,764 | Great Britain | Mar. 1, 1945 |
| 626,073 | Great Britain | July 8, 1949 |

UNITED STATES PATENT OFFICE
CERTIFICATE OF CORRECTION

November 29, 1960

Patent No. 2,961,832

Glenn T. Randol

It is hereby certified that error appears in the above numbered patent requiring correction and that the said Letters Patent should read as corrected below.

Column 2, line 12, after "part" strike out the comma; column 3, line 1, for "spaced forwardly" read -- is provided --; line 12, for "a" read -- said --; column 5, line 7, for "pressure, between the complemental finish" read -- pressure loss between the complemental finished --; line 25, for "indicatd" read -- indicated --; column 6, line 25, for "Figure" read -- Figures --; line 28, for "68" read -- 69 --; same column 6, line 34, for "copensating" read -- compensating --; column 10, line 2, for "dispose" read -- disposed --.

Signed and sealed this 20th day of April 1965.

(SEAL)
Attest:

ERNEST W. SWIDER
Attesting Officer

EDWARD J. BRENNER
Commissioner of Patents